(12) United States Patent
Yablokov

(10) Patent No.: US 8,631,492 B2
(45) Date of Patent: Jan. 14, 2014

(54) DYNAMIC MANAGEMENT OF RESOURCE UTILIZATION BY AN ANTIVIRUS APPLICATION

(71) Applicant: Kaspersky Lab ZAO, Moscow (RU)

(72) Inventor: Victor V. Yablokov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/717,332

(22) Filed: Dec. 17, 2012

(65) Prior Publication Data

US 2013/0247202 A1    Sep. 19, 2013

(30) Foreign Application Priority Data

Mar. 14, 2012  (RU) .................................. 2012109475

(51) Int. Cl.
 *G06F 11/30*    (2006.01)
(52) U.S. Cl.
 USPC ................. 726/22; 718/104; 726/23; 726/24; 726/27
(58) Field of Classification Search
 USPC .................................. 726/1, 24; 718/104, 105
 See application file for complete search history.

(56) References Cited

U.S. PATENT DOCUMENTS

| | | | |
|---|---|---|---|
| 5,434,562 A | 7/1995 | Reardon | |
| 6,088,801 A | 7/2000 | Grecsek | |
| 6,973,653 B1 * | 12/2005 | Fairman et al. | ............... 718/104 |
| 7,293,087 B2 | 11/2007 | Styles et al. | |
| 7,315,904 B2 * | 1/2008 | Geib et al. | ......................... 710/5 |
| 7,373,661 B2 | 5/2008 | Smith et al. | |
| 7,792,661 B1 | 9/2010 | Cooley et al. | |
| 7,937,696 B2 | 5/2011 | Blossom et al. | |
| 7,966,645 B2 * | 6/2011 | Panda et al. | ........................ 726/1 |
| 8,020,192 B2 | 9/2011 | Wright et al. | |
| 8,091,088 B2 * | 1/2012 | Kishan et al. | .................. 718/104 |

(Continued)

FOREIGN PATENT DOCUMENTS

| | | |
|---|---|---|
| EP | 1956509 | 8/2008 |
| GB | 2411988 | 9/2005 |
| WO | WO2005076105 | 8/2005 |
| WO | WO2007075850 | 7/2007 |

OTHER PUBLICATIONS

Belaramani et al., "Dynamic Component Composition for Functionality Adaptation in Pervasive Environments", Department of Computer Science and Information Systems. The University of Hong Kong. 2000.

(Continued)

*Primary Examiner* — Linglan Edwards
(74) *Attorney, Agent, or Firm* — Patterson Theunte Pedersen, P.A.

(57) ABSTRACT

System and method for dynamically managing utilization of computing capacity by an antivirus application having distinct security modules configurable by adjustment of operational parameters. An identification of the computing resources required by each of the security modules to perform certain corresponding security-related functionality is obtained. A current state of authorization granted to the antivirus application to access each of the plurality of computing resources is determined. The operational parameters are adjusted for the at least one of the security modules in response to a determination that the current state of authorization is insufficient for the antivirus application to access certain ones of the computing resources required by the at least one of the security modules to perform its corresponding functionality. The operational parameters are adjusted to disable the corresponding functionality and to thereby de-allocate a portion of the computing capacity needed to execute that corresponding functionality.

26 Claims, 5 Drawing Sheets

(56) References Cited

U.S. PATENT DOCUMENTS

| | | | |
|---|---|---|---|
| 8,453,197 B2 * | 5/2013 | Tai et al. | 726/1 |
| 2003/0056117 A1 | 3/2003 | Elgressy et al. | |
| 2004/0123153 A1 | 6/2004 | Wright et al. | |
| 2005/0268302 A1 * | 12/2005 | Geib et al. | 718/100 |
| 2006/0112416 A1 * | 5/2006 | Ohta et al. | 726/1 |
| 2006/0190482 A1 * | 8/2006 | Kishan et al. | 707/103 Y |
| 2008/0189793 A1 | 8/2008 | Kirkup | |
| 2009/0019535 A1 | 1/2009 | Mishra et al. | |
| 2009/0307746 A1 | 12/2009 | Di et al. | |
| 2010/0033166 A1 | 2/2010 | Helle et al. | |
| 2011/0289308 A1 | 11/2011 | Sobko et al. | |
| 2012/0017262 A1 | 1/2012 | Kapoor et al. | |
| 2012/0180063 A1 * | 7/2012 | Rawlings et al. | 718/104 |

OTHER PUBLICATIONS

Belaramani, "A Component-Based Software System With Functionality Adaptation for Mobile Computing", M. Phil. Thesis. The University of Hong Kong. Aug. 2002.

* cited by examiner

Functionality Database 243

| Module | Required Computing Resources | Module Resource Utilization |
|---|---|---|
| File Antivirus | File System | 7 |
| IM Antivirus | Data Transmitted Using Instant Messaging Tools | 3 |
| Anti-Spam Module | Incoming, Outgoing E-mails | 5 |
| ... | ... | ... |
| Module n | Resources n | Score n |

FIG. 3

DYNAMIC MANAGEMENT OF RESOURCE UTILIZATION BY AN ANTIVIRUS APPLICATION

CLAIM TO PRIORITY

This Application claims the benefit of Russian Federation Patent Application No. 2012109475 filed Mar. 14, 2012, the disclosure of which is incorporated by reference herein.

FIELD OF THE INVENTION

The invention relates generally to information processing and, more particularly, to the efficient management of antivirus applications based on dynamically changing configuration or resource accessibility in a computing device.

BACKGROUND OF THE INVENTION

Due to a wide spread of malicious programs, such as exploits, trojans, computer viruses, network worms and other software causing harm to the users and their data, many users currently prefer to use antivirus software on their computing devices (including mobile ones).

Initially, antivirus software was designed to detect and neutralize malicious applications, restore infected files and prevent infection of files or operating system. However, as new types of computer threats appeared, the set of functions performed by antivirus software constantly grew. Thus, today's antivirus applications, in addition to the file antivirus function, can also perform spam filtering, parental control, mail antivirus, web antivirus, firewall, anti-phishing, confidential information protection and other functions. It is also likely that the set of antivirus functions will continue to grow over time.

However, in order for an antivirus application to be able to perform each of the above mentioned functions, the antivirus application must be able to access specific resources in the system. For example, in order to fully perform the file antivirus function, the antivirus application must be able to access all files and folders of the system. To perform the firewall function, the antivirus application must be able to monitor the condition of all network connections being executed in the system. To act as a mail antivirus, the antivirus application must be able to monitor the flow of all incoming and outgoing electronic messages.

In almost all of today's operating systems, the above mentioned capabilities may not be provided to the antivirus application or may be provided only partially. The reason for this is that, in contemporary operating systems, all applications, including the antivirus applications are, for security reasons, executed on behalf of a user with restricted access rights. As examples, consider the operating systems for mobile devices such as those running the Android, iOS, LiMo, and Bada, in which all third-party applications have (by default) limited rights of access to resources, as well as the Windows Vista and Windows 7 operating systems, where the applications' access to certain resources is monitored by a user account control (UAC) tool.

In this situation, if the antivirus application is not able to access a certain system resource required for the performance of a specific function, the execution of such function becomes not only without benefit but even disadvantageous, as it requires utilizing a certain amount of computing capacity. Examples of such computing capacity utilization can be a certain amount of physical or virtual memory used by the process designed to perform the relevant antivirus application's function. Another example of such computing capacity utilization can be the storage space on the device's non-volatile memory taken by the antivirus application module designed to perform the function. Extra CPU cycles attributed to running processes that do not provide effective antivirus functionality due to the lack of access rights or resources contribute to excess drain on the batteries of mobile devices and take up computing resources that could otherwise be used for smoother running of the operating system, user interface, or useful applications.

There are various ways to modify the operating systems' configurations in order to change the capabilities provided to the applications installed in such systems. For example, the access rights restrictions for the applications in the Android operating system can be removed using a special programming operation known as "rooting". A similar operation, applicable to the iOS operating system, is known as "jailbreaking." The level of control for the access to certain resources by applications in Windows Vista and Windows 7 operating systems can be changed by making adjustments via the user account control tool.

In addition, there are various ways to expand the operating system resources which may be required for the performance of various antivirus application functions. One of these ways is installing system update packs.

Therefore, in the case where the execution of some antivirus application module was prevented or made impossible due to lack of access to the operating system's resources required for the execution of the module, and then the required resource later becomes accessible, then the security provided by the antivirus application will be in a reduced state relative to what could be provided knowing the antivirus application could be made more full-featured.

It should also be noted that, in addition to the dependence of the functions performed by the antivirus application on the availability of access to the resources provided by the operating system or software, the functions performed by an antivirus application also depend on the availability of access to hardware components of the device on which the antivirus application is installed. For example, if, on a personal computer, the devices designed to perform network connections (such as a network card or a wi-fi adapter) are absent or disabled, then the performance of the antivirus functions related to the network connection will be meaningless. Another example can be a disconnection of the cellular radio module (e.g., GSM, CDMA, or the like) in a mobile phone, rendering meaningless the functions of filtering SMS and MMS messages, as well as incoming calls (these functions are often included in the set of functions performed by antivirus applications designed to work on smartphones). In this case, the possibility of accessing the device's hardware components can change as they are turned on and off, such as when using a mobile device's "airplane mode."

Adjustment of security functionality to meet the needs of variable system configurations is generally well-known. For example, antivirus applications running on personal computers interface with the operating system to detect the addition of new hardware components, such as a flash drive, for example, and offer to scan the device.

In U.S. Pat. App. Pub. No. 2006/0112416, a technique for applying security policies associated with particular device configurations is disclosed. A device configuration is determined, stored, and monitored for changes. Based on the detected device configuration, a security policy is obtained. A configuration change detection unit detects changes in configuration, and if any changes are detected, security functionality is adjusted to apply the proper security policy for the detected configuration. This approach is focused on ensuring that sufficiently robust security policies are provided for given system configurations. However, it does not address the possibility that a given system configuration can remain unchanged while access to various computing resources can be varied. For instance, certain security functionality could remain enabled even though there may be no use for it or even though it cannot properly be executed due to certain access restrictions, resulting in needless allocation of resources to support those security functionalities.

A solution is needed to provide improved efficiency while ensuring proper effectiveness of security functionality in an environment where accessibility to computing resources can vary.

SUMMARY OF THE INVENTION

One aspect of the invention is directed to a system for dynamic management of utilization of the computing resources by an antivirus application for use in a computing device having a plurality of computing resources and an operating system interfaced with the computing resources. In the system, a plurality of distinct security modules are defined by program instructions associated with the antivirus application and stored in a non-transitory data storage medium of the computing device that, when executed, cause the computing device to provide a corresponding security-related functionality based on one or more adjustable operational parameters. Adjustment of the one or more adjustable operational parameters for each of the security modules affects allocation of available computing capacity needed to execute the security-related functionality of that security module.

The system includes a dynamic adaptation module defined by program instructions associated with the antivirus application and stored in a non-transitory data storage medium of the computing device. The program instructions of the dynamic adaptation module, when executed, cause the computing device to access a resource requirements data structure stored in a non-transitory data storage medium, the resource requirements data structure containing an identification of the computing resources required by each of the security modules to perform certain corresponding security-related functionality; determine a current state of authorization granted to the antivirus application to access each of the plurality of computing resources via the operating system; compare the current state of authorization with the identification of the computing resources required by at least one of the security modules to produce a comparison result; and automatically adjust the one or more adjustable operational parameters for the at least one of the security modules based on the comparison result.

The adjustment is performed such that such that, in response to a determination that the current state of authorization is insufficient for the antivirus application to access certain ones of the computing resources required by the at least one of the security modules to perform its corresponding functionality, the one or more operational parameters of the at least one of the security modules are adjusted to disable the corresponding functionality and to thereby de-allocate a portion of the computing capacity needed to execute that corresponding functionality.

A method for dynamically managing utilization of computing capacity by an antivirus application according to another aspect of the invention includes storing, by the computing device, a plurality of distinct security modules such as the ones described above; obtaining, by the computing device, an identification of the computing resources required by each of the security modules to perform certain corresponding security-related functionality; determining, by the computing device, a current state of authorization granted to the antivirus application to access each of the plurality of computing resources via the operating system; comparing, by the computing device, the current state of authorization with the identification of the computing resources required by at least one of the security modules to produce a comparison result; and automatically adjusting, by the computing device, the one or more adjustable operational parameters for the at least one of the security modules based on the comparison result.

BRIEF DESCRIPTION OF THE DRAWINGS

The invention may be more completely understood in consideration of the following detailed description of various embodiments of the invention in connection with the accompanying drawings, in which:

FIG. 3 is a diagram illustrating exemplary content of a functionality database according to one embodiment.

Figure 1:
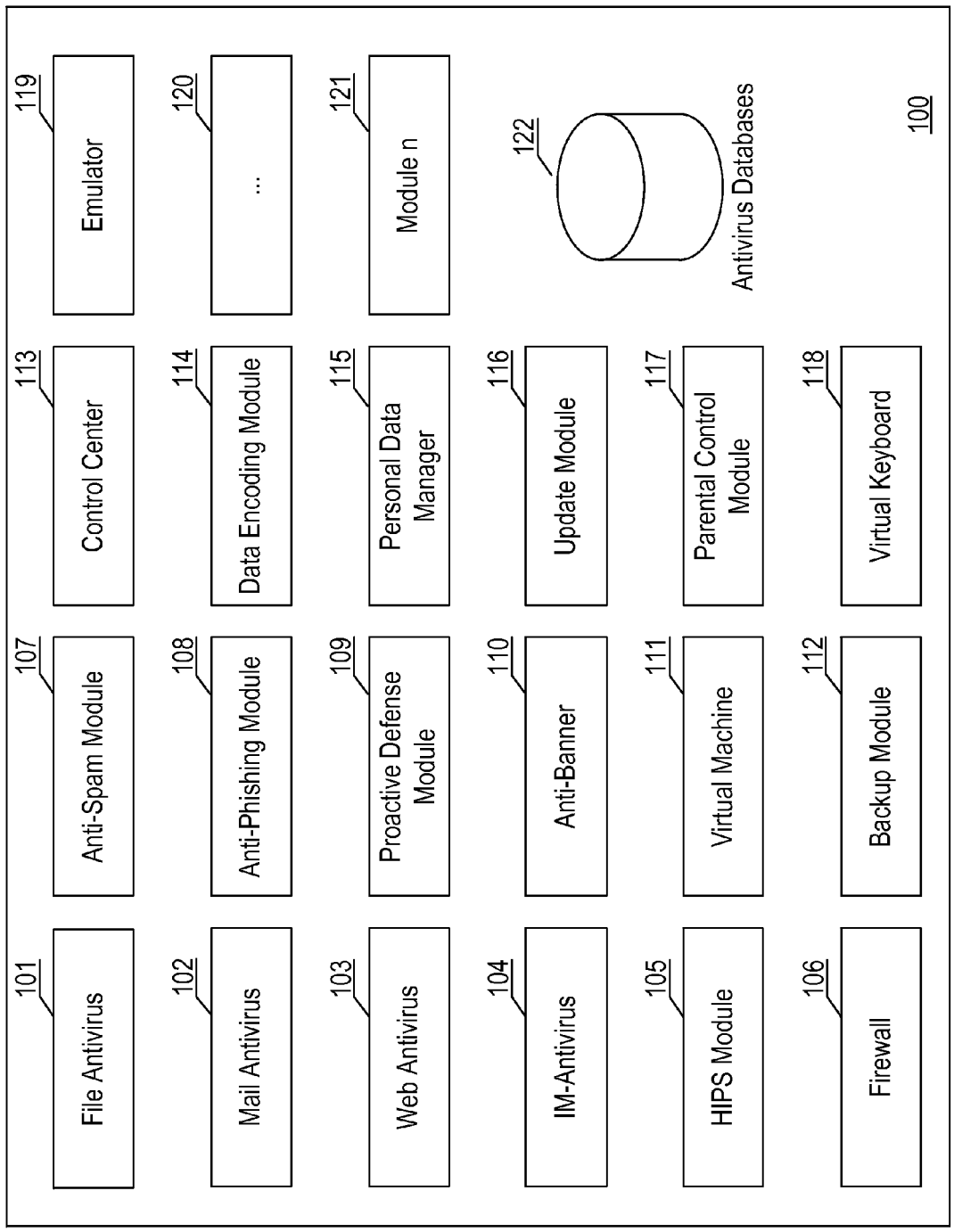
FIG. 1 is a block diagram illustrating an exemplary set of functional modules that are sub-parts of an antivirus application according to one embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

According to aspects of the invention, computer security applications that protect against harmful or undesired programs or other infections via antivirus, firewall, content filtering, and other such functionality (collectively referred to herein as antivirus applications for the sake of brevity) execute a number of different functions to ensure security in the computing device for the benefit of which the antivirus application operates. To this end, an antivirus application generally comprises a variety of subparts, with each sub-part adapted to execute some specific function or set functions.

FIG. 1 is a diagram illustrating an exemplary set of modules that are sub-parts of antivirus application 100 according to one embodiment. The term module or the term tool as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module or tool can also be implemented as a combination of the two, with certain functions facilitated by hardware alone, and other functions facilitated by a combination of hardware and software. In certain implementations, at least a portion, and in some cases, all, of a module or tool can be executed on the processor(s) of one or more general purpose computers (such as the one described in greater detail below) that execute an operating system, system programs, and application programs, while also implementing the module using multitasking, multithreading, distributed (e.g., cloud) processing, or other such techniques. Accordingly, each module or tool can be realized in a variety of suitable configurations, and should not be limited to any particular implementation exemplified herein.

According to one type of embodiment, each module of antivirus application 100 is a distinct component of the antivirus application that can be individually enabled or disabled. For instance, in one embodiment, each module can be executed as a distinct process by the operating system and computing device hardware. Enabling a module of the antivirus application in this sense refers to allocating computing resources of the computing device (e.g., RAM, non-volatile storage, processor cycles, drivers, supervisory processes, etc.) for the execution of the module. Similarly, when a particular module of the antivirus application is disabled, resources of the computing device needed for the execution of the module are de-allocated, or freed-up.

According to various embodiments, each module can be programmed to perform a singular function, or a set of related functions. In the exemplary embodiment depicted in FIG. 1, file antivirus module 101 is adapted to check for potential harmfulness of all files being opened, launched and saved on the user's computer. During this check, each file is analyzed for malicious code in accordance with the knowledge base stored in antivirus databases 122. The knowledge base of antivirus databases 122 contains a variety of data according to various embodiments such as, for example, signatures of known malicious files or portions of malicious code, as well as a set of parameter values defining the operation of such modules as: proactive defense module 109, an anti-spam module 107, a parental control module 117, a mail antivirus module 102, etc. To keep the antivirus databases current, which ensures the reliability of the antivirus application's operation, an update module 116 is employed.

A HIPS (host intrusion prevention system) module 105 is adapted to limit access rights by unknown programs to the computer resources. A proactive defense module 109 is adapted to detect malicious programs by analyzing their behavior. An emulator module 119 and a virtual machine module 111 are adapted to launch unknown executable files in order to check them in a safe environment that is isolated from other applications. A control center module 113 is adapted for remote control of antivirus applications installed on computing devices which belong to a single computer network. A mail antivirus module 102 ensures a check of incoming and outgoing electronic mail for the presence of malicious objects. A web antivirus module 103 is adapted to prevent the execution of a malicious code which may be contained on various websites, when the user visits such sites. An IM-antivirus module 104 is adapted to check the data transferred using instant messaging tools. A firewall module 106 performs monitoring and filtration of network packs going through it, in accordance with preset rules. An anti-spam module 107 is adapted to screen incoming mail for undesirable messages (spam) and to sort it as per the settings set by the user. An anti-phishing module 108 is adapted to prevent the user from opening phishing sites and phishing e-mails. The purpose of the anti-banner module 110 is to block advertising banners which are placed on interne websites and built in the interfaces of various programs. A backup module 112 is adapted to create and store backup copies of files allowing to restore important data in case of their loss. A data encoding module 114 is adapted to prevent unauthorized access to confidential information. A personal data manager module 115 is adapted to store and protect personal data on the user's computing device. A parental control module 117 allows to set restrictions for each computer user on computer and interne usage. A virtual keyboard module 118 allows to perform secure data entry, without fearing the activity of such programs as keyloggers (programs recording the pressing of keys on a keyboard).

In addition, depending on the type of computing device on which the antivirus application is used, other modules can also be included in the antivirus application. For example, antivirus applications used in mobile devices such as smartphones and tablets that have communicator functionality, also contain such modules as an anti-theft module, message filtration module and incoming call filtration module. An anti-theft module is adapted to remotely block a device, delete personal data from it, and locate geographical coordinates using a gps receiver in case of misplacement or theft of the device. A message filtration module is adapted to filter incoming text messages (SMS) and multimedia messages (MMS) in accordance with user-defined settings. An incoming calls filtration module is adapted to protect the user from undesirable calls based on user-made "black" and "white" lists.

It should be noted that the exemplary set of modules discussed above can comprise various different combinations depending on the antivirus application being used, or depending on the type of device on which the antivirus application is run. The set of modules that make up the antivirus application can be any subset of the exemplary modules, or can include additional modules, the necessity for which depends on the user's needs and on the level of security threats.

As it was noted above, in order for each module to be able to perform the functions for which it is designed, the antivirus application must have access to certain operating system resources. For example, to execute the functions of file antivirus module 101, the antivirus application must have access to all system files and folders. For the execution of firewall 106 functions, the antivirus application must have access to data traffic that is transmitted and received via the network interface components, which in turn, are controlled by the operating system, or by a specific networking application.

Additionally, the antivirus application may require access to computing resources 232 normally dedicated to other applications. For instance, to execute anti-spam module 107 and mail antivirus 102 functions, access is needed to incoming and outgoing e-mail messages, which are normally maintained by an email application. Similarly, for the execution of IM-antivirus 104 functions, access is needed to the information transmitted using instant messaging tools.

Moreover, in order to execute certain modules, the antivirus application might require access to certain hardware components of the device on which the antivirus application is installed. For example, in the case of a device that includes mobile telephony functionality, for the execution of message filtration module and incoming calls filtration module functions, the GSM circuit and associated firmware of the mobile device must be enabled. For the execution of the functions of such modules as, for example, the firewall 106 or the update module 116, a network adapter must be present and working, and accessible by the antivirus application.

The level of the antivirus application's access to the computing resources that are required for the operation of various modules of the antivirus application can vary in real time. Therefore, aspects of the invention utilize an approach where the antivirus application's functionality is dynamically adjusted to match the current capabilities and access rights provided to it in the computing device.

Figure 2:
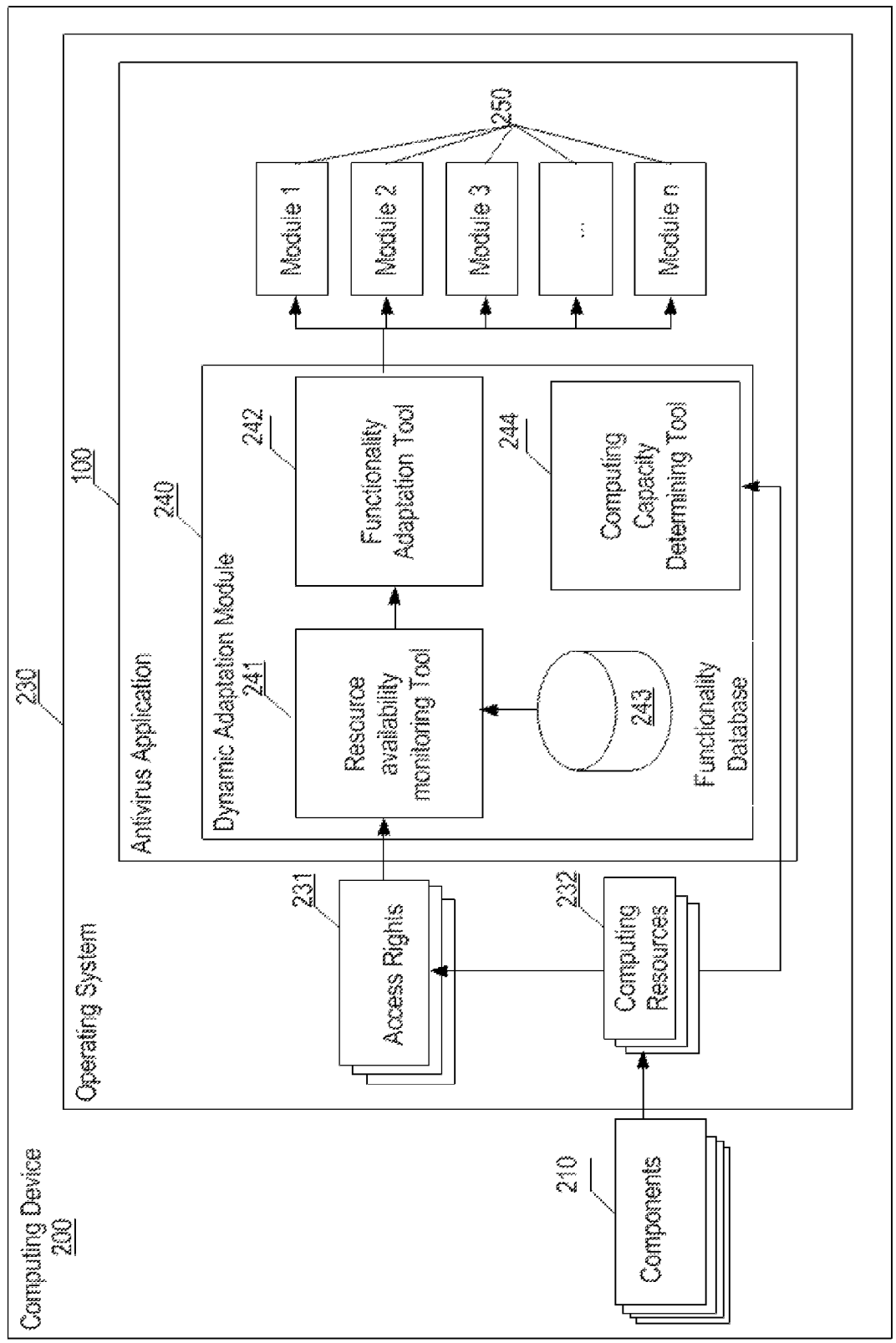
FIG. 2 is a block diagram illustrating an exemplary computer system according to one type of embodiment in which an antivirus application is configured with a dynamic adaptation module for enabling and disabling various functionality to match the available computing resources.

FIG. 2 is a block diagram illustrating an exemplary computer system according to one type of embodiment in which an antivirus application is configured with a dynamic adaptation module 240 for enabling and disabling various functionality to match the available computing resources. In the embodiment shown, the dynamic adaptation module 240 is itself a part of the antivirus application 100 installed in the operating system 230 on a computing device 200. In various embodiments, computing device 200 can be a desktop personal computer, a notebook computer, a netbook, tablet computer, mobile phone, or other electronic personal computing device. Operating system 230 includes a number of computing resources 232. Computing resources 232 of operating system 230 include various hardware, firmware, and related lower-level software components 210 of computing device 200, which can be abstracted at a higher level via operating system drivers, application program interfaces (APIs), services, and user interface objects. For example, such hardware components as data storage media are represented in the operating system as file system folders. Hardware components such as a network interface adapter are represented in the operating system as a network connection. In addition to the dynamic adaptation module 240, the antivirus application 100 includes a certain number of functional modules 250, examples of which were provided above.

Each of the modules 250 of the antivirus application 100 needs access to certain computing resources 232 of the system 230 in order to perform its functions. In this case, the availability and accessibility of each of the computing resources 232 for applications installed in the operating system 230 (particularly, the antivirus application 100) is established using the access rights 231.

In the embodiment depicted, the information indicating which of the particular computing resources 232 of the operating system 230 must be accessed by each of the modules 250 to have effective functionality is stored in functionality database 243 of the dynamic adaptation module 240. The functionality database 243 is an example of a data structure in which the information can be stored. Any suitable data structure may be utilized to this end. In a related embodiment, the information is stored in a data structure that is stored in a remote computer system but otherwise accessible to the dynamic adaptation module 240.

In various embodiments, what constitutes effective functionality can vary. For instance, in one embodiment, effective functionality is equated to full functionality. In another embodiment effective functionality corresponds to certain minimum standards. Varying levels of functionality are considered in this type of embodiment when the particular module 250 has more than one function. Based on this information, for each of the modules 250, functionality database 243 contains information defining the required levels of access to the computing resources 232 that modules of the antivirus application must have in order to provide effective operation of that module. This information is provided to resource availability monitoring tool 241.

The resource availability monitoring tool 241 is configured to determine a current state of accessibility to computing resources 232 that the antivirus application 100 has, considering that the antivirus application is running on behalf of a user or process having certain access rights to individual ones of the computing resources 232. The determination of the current level of accessibility can be performed periodically, upon expiry of a preset time interval, in response to certain events occurring on the computing device 200, or any suitable combination of these approaches. In various examples, the determination of the accessibility level can be performed during startup of the operating system 230, or during the unlocking or returning from standby mode of the computing device 200, or when a new hardware component 210 is connected to the device 200.

Notably, in certain embodiments, resource availability monitoring tool 241 determines not only the presence of a given computing resource in the computer device 200, but also the access rights to that resource that are available to antivirus application 100, which may be operating subject to a particular set of rights granted to a user account that the antivirus application is serving. Different user accounts can have different levels of access to the computing resources 232. For instance, an administrator account generally has a more complete set of access rights to computing resources 232 than a basic user account.

In response to obtaining the determination of actual and specific accessibility to each of the resources by the modules of antivirus application 100, the resource availability monitoring tool 241 passes that information to the functionality adaptation tool 242. Based on the resource accessibility information passed to it, the functionality adaptation tool 242 compares the required resources needed for effective operation of each of the modules 250 with the current (i.e., actual) accessibility to the computing resources 232. In another embodiment, functionality adaptation tool 242 does not perform this type of comparison, rather, the information that it receives from resource availability monitoring tool 241 already reflects a result of such comparison having been made.

In response to the results of this comparison, functionality adaptation tool 242 automatically (i.e., without user intervention) adjusts the operational parameters of individual ones of the modules 250 if appropriate, so as to make suitable use of the available computing resources 232 according to the present state of accessibility. For example, in one approach, functionality adaptation tool 242 makes the most use of the available computing resources 232 so as to provide the most security-related functionality that is possible under the circumstances. In another, more nuanced, approach, other considerations are taken into account, such as the available computing capacity, which in a reduced state may make a reduced set of functionality more preferable.

Functionality adaptation tool 242 changes the operational parameters to operate antivirus application 100 more economically when it is determined that antivirus application 100 is unable to provide certain functions under the present state of accessibility to the computing resources 232. These changes can involve enabling or disabling certain modules 250, or adjusting operational parameters of certain modules 250 to selectively turn on and off specific functions of those security modules 250.

In one such embodiment, in response to a determination that the current state of authorization is insufficient for the antivirus application 100 to access certain ones of the computing resources 232 required by at least one of the security modules 250 to perform corresponding functionality, the one or more operational parameters of the security module(s) are adjusted to disable the corresponding functionality and to thereby de-allocate a portion of the computing capacity needed to execute that corresponding functionality. As a result, the computing device 200 is less burdened by having to execute instructions associated with security functionality that cannot be performed effectively, and can operate more smoothly to provide a better user experience.

Likewise, if the current state of access to the computing resources 232 granted to the antivirus application 100 increases, the dynamic adaptation module 240 can increase the functionality of the antivirus application 100. For example, if, after the modification of the access rights of the user on behalf of whom the antivirus application is executed in the system, the antivirus application gains access to new portions of the file system subject to antivirus checking, for example, system folders, then this additional access right is detected and the operational parameters of the file antivirus module 101 are adjusted so as to include these system resources in the antivirus check domain.

In another example, in response to activation and de-activation of a Bluetooth module in a mobile device such as a smartphone, an adjustment is instituted to the operational parameters of various antivirus application modules 250 in order to enable or disable the performing of a check of the packets transmitted using the Bluetooth module's communication channel. In one particular embodiment of the present invention, the functionality adaptation tool 242 performs the following:

De-activation of the enabled modules 250, if, based on the received information from resource availability monitoring tool 241, the computing resources 232 required for the effective operation of these modules are determined to have become inaccessible to the antivirus application;

Re-activation of the disabled modules 250, if, based on the received information from resource availability monitoring tool 241, the computing resources 232 required for the operation of these modules are determined to have become accessible by the antivirus application.

For example, if certain ones of the computing resources needed for the execution of network connections are absent or disabled in the device, the operation of the firewall module 106 becomes more wasteful than meaningful and, in the interest of freeing up computing resources allocated to the firewall module 106, the firewall module should be disabled. If, subsequently, the resource(s) needed for the operation of the network connection become available and accessible to the antivirus application 100, the firewall module 106 becomes able to provide effective protection and should be enabled in the interest of improving the security functionality in the device 200.

In a related type of embodiment, the accessibility check of the computing resources 232 can be performed not for all modules 250 of the antivirus application 100, but only for some of them. For instance, in one particular embodiment of this type, only those modules among modules 250 which have relatively high resource requirements for their operation, i.e., performing processor-intensive, or memory-intensive tasks, are subject to adjustment based on changes in system configuration or access permissions. The threshold of resource utilization level at which the adjustment of antivirus module configuration comes into effect can be based on the available computing capacity of computing device 200. Thus, for instance, a more powerful computing device can have fewer antivirus modules subject to configuration adjustment than a relatively less powerful computing device.

The available computing capacity in this example can be a dynamic parameter that changes based on the present circumstances. Accordingly, when the computing resources of device 200 are being utilized at a relatively higher intensity, the available computing capacity would be lower than when the same computing device is idling. Similarly, the battery life remaining can also be a factor determining the available computing capacity, with lower remaining battery life corresponding to fewer available computing capacity.

In a related embodiment, the available computing capacity is assessed by automatically examining the present workload of computer resources. In one example, a computing capacity determining tool 244 collects information indicative of the current operational load of the computer system. In one example, the data collection is performed by a locally-running process on the subject PC. For instance, computing capacity determining tool 244 can create a locally running process to perform this collection. In another embodiment, computing capacity determining tool 244 includes a script execution module that executes a data collection script that is retrieved from a remote computer, such as from a server.

In a related embodiment, the computing capacity determining tool 244 also assesses the degree of the system's workload. Embodiments of this type include various known methods of assessment to obtain information about the workload of key computer resources in corresponding units. For example, this information is available for the following resources and their corresponding exemplary measurable parameters:

Central processing unit (degree of workload, in percentages)

RAM (amount of used RAM, RAM read/write bandwidth, in MB/sec)

non-volatile storage (amount of used space; and/or read/write bandwidth, in Kbytes/sec)

Network (bandwidth of connections, Mbps)

In the simplest case, only one (most critical) critical parameter can be looked to as in indicator of the degree of utilization of each corresponding resource. In other embodiments, a plurality of different parameters may be used as indicators of resource utilization or workload. In one example, different parameters are given different weights based on their degrees of relative importance to the performance of the computer system.

Using one or more of the monitored parameters, the degree of the system workload is estimated. For example, to assess the workload of the non-volatile storage one can use an indicator of the percentage of used storage space.

In one embodiment, a threshold is set for degree of system utilization, or workload. The threshold may be set to correspond to a level of system workload at which point the management of the workload via reduction in resource utilization by the antivirus application 100 is desired. For example, active management of workload may be desired at a point where the user notices some degree of sluggishness, or performance reduction. The threshold can be established for the user based on predetermined criteria, or may be set by the user herself through a user interface.

Application of the antivirus application functionality adaptation technique according to embodiments of the invention can improve overall computer system performance. In some cases, the performance is optimized. As used herein, the term optimization of performance does not necessarily mean achieving the absolute best possible (i.e., fully maximized) performance, although in some circumstances maximum performance may be achieved. Instead, optimization of performance means achieving a performance level, the further improvement of which would provide an insubstantial effect from a practical standpoint, under the prevailing circumstances.

In another example, the workload threshold is set and varied based on the nature of the programs being run, and the user's corresponding sensitivity to reduced system performance (or a predetermined level of sensitivity corresponding to the programs being run). For instance, when a user is playing multimedia files, such as videos, or when the user is playing interactive games, even a relatively minor amount reduced system performance is much more noticeable and annoying to a user than other, less user-interactive activities, such as backing up files, rendering a still image, compiling a computer program, or working in a word processor or other business application. In one example case, additional parameters, such as the extent of use of user input devices, the extent of use of graphics processing and sound devices, and the like, may be monitored, and the threshold can be dynamically adjusted up or down based on a heavier weighting assigned to such parameters. In another example case, the computing capacity determining tool 244 examines the process list and compares a knowledge base of popular programs (or their processes) against the most resource-intensive programs or processes currently running, and adjusts the threshold dynamically based on a pre-associated level of user sensitivity for each of the primary currently-running programs or processes.

With the workload threshold being set at a point where system performance is noticeably degraded, if this threshold is not met or exceeded, no significant benefit would be achieved by active management of the resource utilization of the antivirus application 100; thus, active management is not carried out and the process does not advance to that point. Thus, the task of optimizing the use of computer resources can be considered completed.

On the other hand, if the system workload meets or exceeds the set threshold, the system resource management process is permitted to advance to the next stage of assessing the availability and accessibility of computing resources.

In one embodiment of the invention, if the information about a certain module is stored in the functionality database 243 of the dynamic adaptation module 240, while the module itself is absent from among the modules 250 of the antivirus application 100, such module can be obtained from a remote computer system, such as an update server, via a local computing network, the Internet, or through other communication channels provided on the computing device 200. In a related embodiment, by using the above mentioned communication channels, settings and add-ons for various antivirus application modules are obtained for changing the operational parameters of those modules.

FIG. 3 illustrates an exemplary functionality database 243. The functionality database 243 of the dynamic adaptation module 240 contains information on which computing resources 232 of the operating system 230 must be available and accessible for effective functioning of each of the modules 250. Each of the modules 250 in the functionality database 243 is matched with a list of computing resources 232, which must be accessible by the antivirus application 100 for effective functioning of these modules. For the sake of brevity, the following modules are presented in this example: a file antivirus, an IM antivirus, and an anti-spam module. However, it should be understood that the number of modules 250 of the antivirus application 100, information on which is contained in the functionality database 243, is not limited to any particular subset of modules 250.

In one embodiment, as depicted, the functionality database 243 includes a module resource utilization score for corresponding to each of the modules 250. This score represents the savings in resource utilization that could be achieved if the module is active but unable to perform its functionality to an effective extent due to lack of access to its required computing resources. In this embodiment, the module resource utilization score is considered along with the assessment of workload or availability of computing resources in order to determine the practical benefit of disabling the non-functioning module. If, for example, the practical benefit is relatively low while the current workload is also low (i.e., the computing capacity availability is high), disabling of the non-functioning module becomes impractical. On the other hand, if there is significant computing resource capacity to be reclaimed from disabling non-functional antivirus application modules, the process can be carried out. This assessment can be done on a module-by-module basis (since each module has a different level of resource utilization) in one embodiment, or, in another embodiment, the potential savings can be evaluated as a whole.

In various embodiments of the invention, the functionality database 243 can receive updates from an update server through a local computing network, the Internet or other suitable communication channels coupled to computing device 200.

Figure 4:
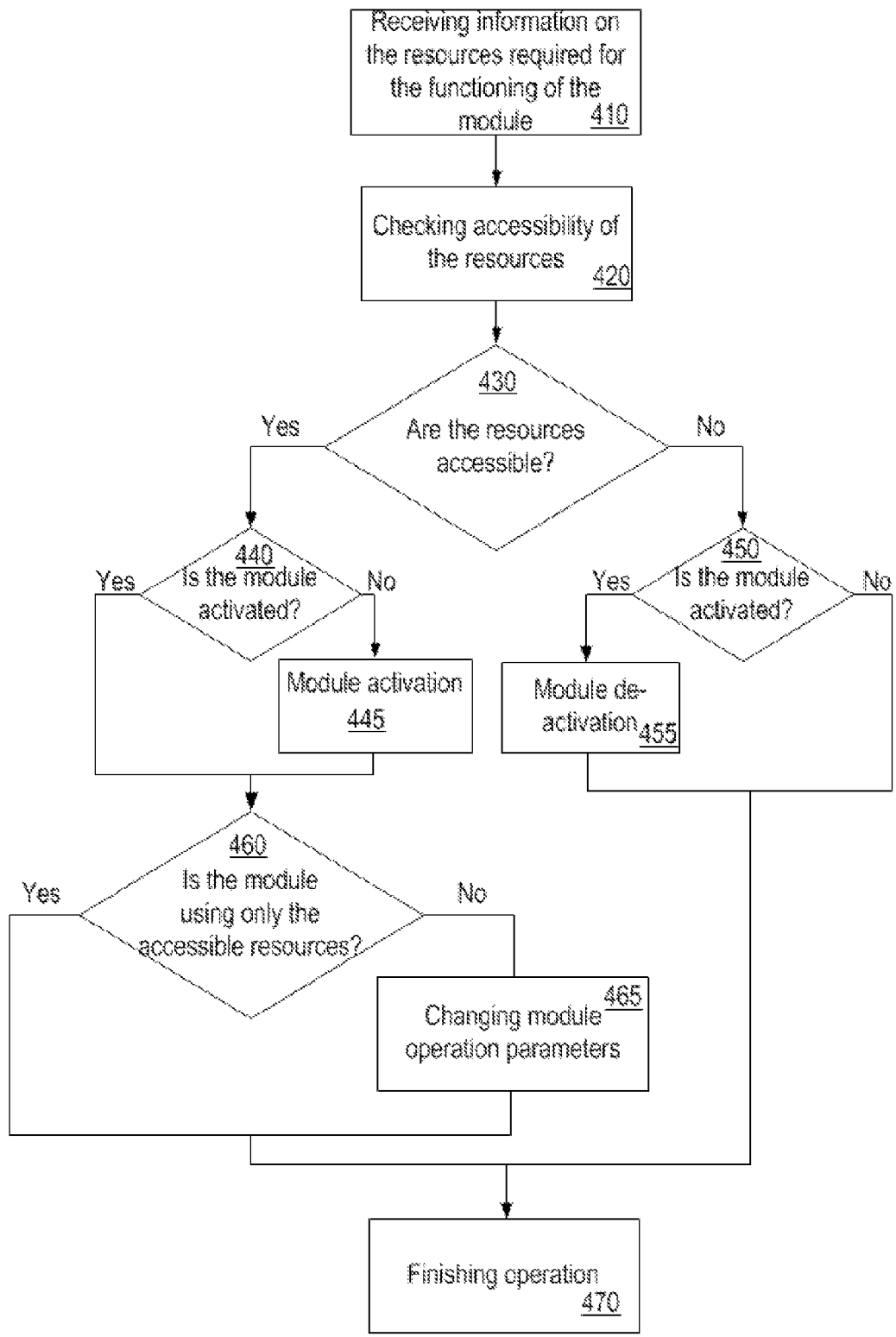
FIG. 4 is a diagram illustrating an exemplary process of operation of an antivirus application's dynamic adaptation module according to one embodiment.

FIG. 4 is a diagram illustrating an exemplary process of operation of an antivirus application's dynamic adaptation module. To simplify the understanding of the main operation principles, the operation algorithm of a dynamic adaptation module for only one module of an antivirus application is presented in this example. The operation process of a dynamic adaptation module corresponding to multiple modules of an antivirus application is similar to the one described herein and essentially involves repeating the process for each of the multiple modules. At stage 410, the resource availability monitoring tool 241 receives from the functionality database 243 information on computing resources 232 of the operating system 230 required for the functioning of a certain module 250. At stage 420, the resource availability monitoring tool 241 checks the accessibility of the specified computing resources 232, after which, at stage 430, it determines whether the resources are accessible. If the resources are accessible, the functionality adaptation tool 242 determines at stage 440 whether the module 250, for which the check is being performed, is active. If the module is inactive, the functionality adaptation tool 242 performs, at stage 445, the activation of the module. Then, for the activated module, at stage 460, the functionality adaptation tool 242 determines whether the module fully uses only those computing resources 232 which are accessible. If the module fully uses only the accessible computing resources 232, the dynamic adaptation module of the antivirus application 240 finishes its operation at stage 470. If that is not the case, the functionality adaptation tool 242, at stage 465, changes the operation parameters of the antivirus application's module so that only accessible computing resources 232 would be fully used, after which, at stage 470, the dynamic adaptation module of the antivirus application 240 finishes its operation. If, at stage 430, the resource availability monitoring tool 241 has determined that the resources are inaccessible, the functionality adaptation tool 242, at stage 450, also determines whether module 250, for which the check is being performed, is active. If the module is active, the functionality adaptation tool 242, at stage 455, disables that module, after which, at stage 470, the dynamic adaptation module 240 finishes its operation. If that is not the case, the dynamic adaptation module 240 finishes its operation at stage 470, without taking any actions.

Figure 5:
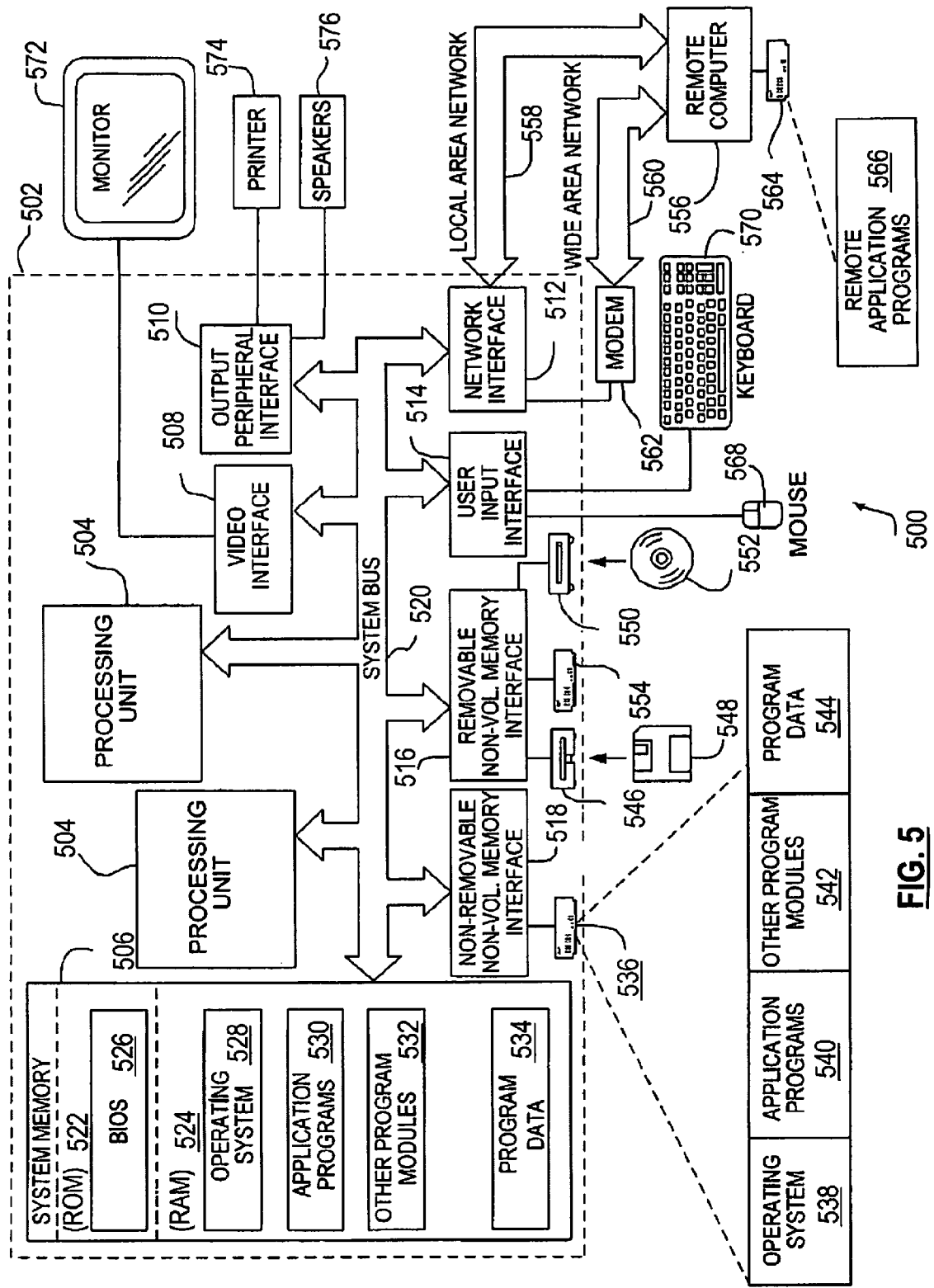
FIG. 5 is a diagram illustrating a general-purpose computer system on which aspects of the invention may be implemented according to various embodiments.

FIG. 5 is a diagram illustrating a general-purpose computer system 500 on which aspects of the invention as described herein may be implemented according to various embodiments. The computer system 500 may include a computing device such as a personal computer 502. The personal computer 502 includes one or more processing units 504, a system memory 506, a video interface 508, an output peripheral interface 510, a network interface 512, a user input interface 514, removable 516 and non-removable 518 memory interfaces and a system bus or high-speed communications channel 520 coupling the various components. In various embodiments, the processing units 504 may have multiple logical cores that are able to process information stored on computer readable media such as the system memory 506 or memory attached to the removable 516 and non-removable 518 memory interfaces 518. The computer 502 system memory 506 may include non-volatile memory such as Read Only Memory (ROM) 522 or volatile memory such as Random Access Memory (RAM) 524. The ROM 522 may include a basic input/output system (BIOS) 526 to help communicate with the other portion of the computer 502. The RAM 524 may store portions of various software applications such as the operating system 528, application programs 530 and other program modules 532. Further, the RAM 524 may store other information such as program or application data 534. In various embodiments, the RAM 524 stores information that requires low-latencies and efficient access, such as programs and data being manipulated or operated on. In various embodiments RAM 524 comprises Double Data Rate (DDR) memory, Error Correcting memory (ECC) or other memory technologies with varying latencies and configurations such as RAMBUS or DDR2 and DDR3. In this way, in various embodiments, the system memory 506 may store the input data store, access credential data store, operating memory data store, instruction set data store, analysis result data store and the operating memory data store. Further, in various embodiments, the processing units 504 may be configured to execute instructions that limit access to the aforementioned data stores by requiring access credential before access to the information is granted.

The removable 516 and non-removable 518 memory interfaces may couple the computer 502 to disk drives 536 such as SSD or rotational disk drives. These disk drives 536 may provide further storage for various software applications such as the operating system 538, application programs 540 and other program modules 542. Further, the disk drives 536 may store other information such as program or application data 544. In various embodiments, the disk drives 536 store information that doesn't require the same low-latencies as in other storage mediums. Further, the operating system 538, application program 540 data, program modules 542 and program or application data 544 may be the same information as that stored in the RAM 524 in various embodiments mentioned above or it may be different data potentially derivative of the RAM 524 stored data.

Further, the removable non-volatile memory interface 516 may couple the computer 502 to magnetic portable disk drives 546 that utilize magnetic media such as the floppy disk 548, Iomega® Zip or Jazz, or optical disk drives 550 that utilize optical media 552 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 502 may utilize the network interface 512 to communicate with one or more remote computers 556 over a local area network (LAN) 558 or a wide area network (WAN) 560. The network interface 512 may utilize a Network Interface Card (NIC) or other interface such as a modem 562 to enable communication. The modem 562 may enable communication over telephone lines, coaxial, fiber optic, powerline, or wirelessly. The remote computer 556 may contain a similar hardware and software configuration or may have a memory 564 that contains remote application programs 566 that may provide additional computer readable instructions to the computer 502. In various embodiments, the remote computer memory 564 can be utilized to store information such as identified file information that may be later downloaded to local system memory 506. Further, in various embodiments the remote computer 556 may be an application server, an administrative server, client computers, or a network appliance.

A user may enter information to the computer 502 using input devices connected to the user input interface 514 such as a mouse 568 and keyboard 570. Additionally, the input device may be a trackpad, fingerprint scanner, joystick, barcode scanner, media scanner or the like. The video interface 508 may provide visual information to a display such as a monitor 572. The video interface 508 may be an embedded interface or it may be a discrete interface. Further, the computer may utilize a plurality of video interfaces 508, network interfaces 512 and removable 516 and non-removable 518 interfaces in order to increase the flexibility in operation of the computer 502. Further, various embodiments utilize several monitors 572 and several video interfaces 508 to vary the performance and capabilities of the computer 502. Other computer interfaces may be included in computer 502 such as the output peripheral interface 510. This interface may be coupled to a printer 574 or speakers 576 or other peripherals to provide additional functionality to the computer 502.

Various alternative configurations and implementations of the computer 502 are within the spirit of the invention. These variations may include, without limitation, additional interfaces coupled to the system bus 520 such as universal serial bus (USB), printer port, game port, PCI bus, PCI Express or integrations of the various components described above into chipset components such as the northbridge or southbridge. For example, in various embodiments, the processing unit 504 may include an embedded memory controller (not shown) to enable more efficient transfer of data from the system memory 506 than the system bus 520 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features;

rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a computing device comprising a plurality of computing resources and an operating system interfaced with the computing resources, a system for dynamic management of utilization of computing capacity by an antivirus application, the system comprising:
   a plurality of distinct security modules defined by program instructions associated with the antivirus application and stored in a non-transitory data storage medium of the computing device that, when executed, cause the computing device to provide a corresponding security-related functionality based on one or more adjustable operational parameters, wherein adjustment of the one or more adjustable operational parameters for each of the security modules affects allocation of available computing capacity needed to execute the security-related functionality of that security module;
   a dynamic adaptation module defined by program instructions associated with the antivirus application and stored in a non-transitory data storage medium of the computing device that, when executed, cause the computing device to:
      access a resource requirements data structure stored in a non-transitory data storage medium, the resource requirements data structure containing an identification of the computing resources required by each of the security modules to perform certain corresponding security-related functionality;
      determine a current state of authorization granted to the antivirus application to access each of the plurality of computing resources via the operating system;
      compare the current state of authorization with the identification of the computing resources required by at least one of the security modules to produce a comparison result; and
      automatically adjust the one or more adjustable operational parameters for the at least one of the security modules based on the comparison result such that, in response to a determination that the current state of authorization is insufficient for the antivirus application to access certain ones of the computing resources required by the at least one of the security modules to perform its corresponding functionality, the one or more operational parameters of the at least one of the security modules are adjusted to disable the corresponding functionality and to thereby de-allocate a portion of the computing capacity needed to execute that corresponding functionality.

2. The system of claim 1, wherein the dynamic adaptation module stores the resource requirements data structure using the computing resources of the computing device.

3. The system of claim 1, wherein the identification of the computing resources required by each of the security modules to perform certain corresponding security-related functionality indicates the computing resources needed for full functionality of each of the security modules.

4. The system of claim 1, wherein the identification of the computing resources required by each of the security modules to perform certain corresponding security-related functionality indicates the computing resources needed for a predefined minimal essential functionality of each of the security modules.

5. The system of claim 1, wherein the identification of the computing resources required by each of the security modules to perform certain corresponding security-related functionality indicates the computing resources needed for certain specified individual functions of certain security modules having multiple functions.

6. The system of claim 1, wherein the antivirus application is subject to a particular set of rights granted to a user account that the antivirus application is serving.

7. The system of claim 1, wherein the dynamic adaptation module includes a functionality adaptation tool configured to make the determination as to whether the current state of authorization is insufficient for the antivirus application to access certain ones of the computing resources required by the at least one of the security modules to perform corresponding functionality.

8. The system of claim 1, wherein the dynamic adaptation module is configured to adjust the one or more operational parameters by enabling and disabling entire security modules.

9. The system of claim 1, wherein the dynamic adaptation module is configured to adjust the one or more operational parameters by enabling and disabling certain portions of the security modules to individually control certain functions of the security modules.

10. The system of claim 1, wherein the dynamic adaptation module is configured to automatically adjust the one or more adjustable operational parameters for at least one of the security modules based on the comparison result such that, in response to a determination that the current state of authorization is sufficient for the antivirus application to access certain ones of the computing resources required by the at least one of the security modules to perform its corresponding functionality, the one or more operational parameters of the at least one of the security modules are adjusted to enable the corresponding functionality and to thereby allocate a portion of the computing capacity needed to execute that corresponding functionality.

11. The system of claim 1, wherein said at least one of the security modules that are subject to adjustment of operational parameters by the dynamic adaptation module include only a subset of all of the security modules present in the antivirus application, wherein the subset includes selected security modules that have relatively higher resource requirements for their operation than the security modules not included in the subset.

12. The system of claim 1, wherein the dynamic adaptation module includes a computing capacity determining tool configured to collect information indicative of a current operational load of the computing device; and wherein the dynamic adaptation module is configured to adjust the one or more operational parameters only in response to the current operational load being above a workload threshold.

13. The system of claim 12, wherein the workload threshold is a dynamic threshold that is automatically adjustable based on a current nature of use of the computer system.

14. The system of claim 13, wherein the current nature of the use of the computer system is automatically determined periodically.

15. The system of claim 13, wherein the current nature of the use of the computer system is automatically determined based on events indicative of a level of utilization of computing resources.

16. In a computing device comprising a plurality of computing resources and an operating system interfaced with the computing resources, a method for dynamically managing utilization of computing capacity by an antivirus application, the method comprising:
   storing, by the computing device, a plurality of distinct security modules that cause the computing device to provide a corresponding security-related functionality based on one or more adjustable operational parameters, wherein adjustment of the one or more adjustable operational parameters for each of the security modules affects allocation of available computing capacity needed to execute the security-related functionality of that security module;
   obtaining, by the computing device, an identification of the computing resources required by each of the security modules to perform certain corresponding security-related functionality;
   determining, by the computing device, a current state of authorization granted to the antivirus application to access each of the plurality of computing resources via the operating system;
   comparing, by the computing device, the current state of authorization with the identification of the computing resources required by at least one of the security modules to produce a comparison result; and
   automatically adjusting, by the computing device, the one or more adjustable operational parameters for the at least one of the security modules based on the comparison result such that, in response to a determination that the current state of authorization is insufficient for the antivirus application to access certain ones of the computing resources required by the at least one of the security modules to perform its corresponding functionality, the one or more operational parameters of the at least one of the security modules are adjusted to disable the corresponding functionality and to thereby de-allocate a portion of the computing capacity needed to execute that corresponding functionality.

17. The method of claim 16, wherein the identification of the computing resources required by each of the security modules to perform certain corresponding security-related functionality indicates the computing resources needed for a predefined minimal essential functionality of each of the security modules.

18. The method of claim 16, wherein the identification of the computing resources required by each of the security modules to perform certain corresponding security-related functionality indicates the computing resources needed for certain specified individual functions of certain security modules having multiple functions.

19. The method of claim 16, wherein the identification of the computing resources required by each of the security modules to perform certain corresponding security-related functionality indicates the computing resources needed for full functionality of each of the security modules.

20. The method of claim 16, wherein the automatically adjusting of the one or more operational parameters includes enabling and disabling entire security modules.

21. The method of claim 16, wherein the automatically adjusting of the one or more operational parameters includes enabling and disabling certain portions of the security modules to individually control certain functions of the security modules.

22. The method of claim 16, further comprising:
   automatically adjusting the one or more adjustable operational parameters for at least one of the security modules based on the comparison result such that, in response to a determination that the current state of authorization is sufficient for the antivirus application to access certain ones of the computing resources required by the at least one of the security modules to perform its corresponding functionality, the one or more operational parameters of the at least one of the security modules are adjusted to enable the corresponding functionality and to thereby allocate a portion of the computing capacity needed to execute that corresponding functionality.

23. The method of claim 16, wherein said at least one of the security modules that are subject to adjustment of operational parameters by the dynamic adaptation module include only a subset of all of the security modules present in the antivirus application, wherein the subset includes selected security modules that have relatively higher resource requirements for their operation than the security modules not included in the subset.

24. The method of claim 16, further comprising:
   automatically collecting, by the computing device, information indicative of a current operational load of the computing device; and
   adjusting the one or more operational parameters only in response to the current operational load being above a workload threshold.

25. The method of claim 24, further comprising dynamically adjusting the workload threshold based on a current nature of use of the computer system.

26. In a computing device comprising a plurality of computing resources and an operating system interfaced with the computing resources, a system for dynamically managing utilization of computing capacity by an antivirus application, the system comprising:
   means for storing a plurality of distinct security modules that cause the computing device to provide a corresponding security-related functionality based on one or more adjustable operational parameters, wherein adjustment of the one or more adjustable operational parameters for each of the security modules affects allocation of available computing capacity needed to execute the security-related functionality of that security module;
   means for obtaining an identification of the computing resources required by each of the security modules to perform certain corresponding security-related functionality;
   means for determining by the computing device a current state of authorization granted to the antivirus application to access each of the plurality of computing resources via the operating system;
   means for comparing by the computing device the current state of authorization with the identification of the computing resources required by at least one of the security modules to produce a comparison result; and means for adjusting the one or more adjustable operational parameters for the at least one of the security modules based on the comparison result such that, in response to a determination that the current state of authorization is insufficient for the antivirus application to access certain ones of the computing resources required by the at least one of the security modules to perform its corresponding functionality, the one or more operational parameters of the at least one of the security modules are adjusted to disable the corresponding functionality and to thereby de-allocate a portion of the computing capacity needed to execute that corresponding functionality.

\* \* \* \* \*